Feb. 15, 1955     E. E. GILBERT     2,702,305
PROCESS FOR PREPARING DODECACHLOROTETRAHYDRO-4,7-METHANOINDENE
Filed April 6, 1951
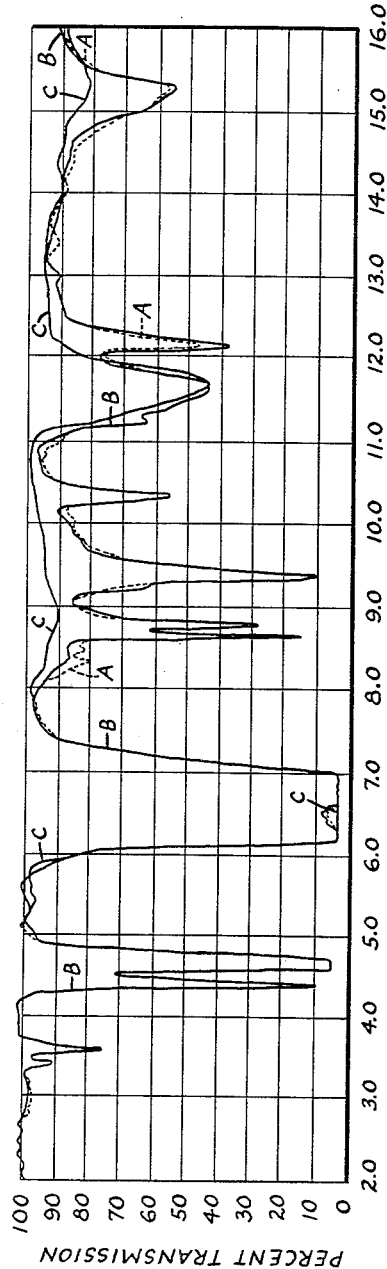
INVENTOR.
EVERETT E. GILBERT
BY Elizabeth Hunter
ATTORNEY.

United States Patent Office 2,702,305
Patented Feb. 15, 1955

2,702,305

PROCESS FOR PREPARING DODECACHLORO-TETRAHYDRO-4,7-METHANOINDENE

Everett E. Gilbert, Flushing, N. Y., assignor to Allied Chemical & Dye Corporation, New York, N. Y., a corporation of New York Application April 6, 1951, Serial No. 219,739

3 Claims. (Cl. 260—648)

This invention relates to a new method for preparing dodecachlorotetrahydro-4,7-methanoindene, a dimer of hexachlorocyclopentadiene, by the reaction of phosphorus pentachloride with decachlorotetrahydro-4,7-methanoindeneone.

Hexachlorocyclopentadiene dimer has been prepared in the past by the condensation of hexachlorocyclopentadiene with aluminum chloride as described in J. Am.. Chem. Soc. 71, page 954, March 1949, in the description of which process no structure was assigned to the hexachlorocyclopentadiene dimer.

I have now discovered the new process described below for preparing hexachlorocyclopentadiene dimer (dodecachlorotetrahydro-4,7-methanoindene). This compound is useful as an intermediate in carrying out chemical reactions and as an insecticide.

The decachlorotetrahydro-4,7-methanoindeneone which forms the starting material for my new reaction may be prepared, for example, as described in my copending application with Silvio L. Giolito, Serial No. 196,123, filed November 17, 1950 now U. S. Patent 2,616,928, by condensing two molecules of hexachlorocyclopentadiene with the aid of sulfur trioxide to form a hexachlorocyclopentadiene-$SO_3$ reaction product and hydrolyzing the resulting reaction product to the ketone. It is believed to be the 2,3,3a,4,5,6,7,7a,8,8-decachloro-3a,4,7,7a-tetrahydro-4,7-methanoindene-1-one illustrated below, and usually exists in the form of a hydrate in a wide range of degrees of hydration.

The reaction as carried out according to my invention proceeds as follows:

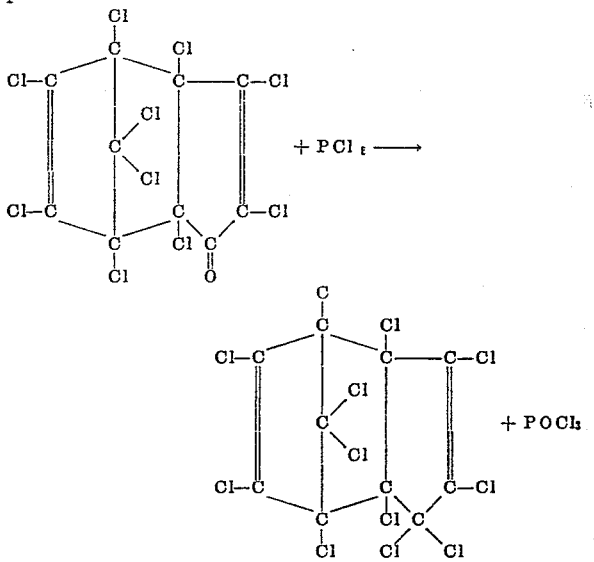

In the drawing, the single figure illustrates the infrared spectrogram of dodecachlorotetrahydro-4,7-methanoindene. The dotted line A illustrates the spectrogram of the dimer as prepared according to the process of my invention; the solid line B illustrates the spectrogram of the dimer resulting as the reaction product of hexachlorocyclopentadiene with aluminum chloride. These spectrograms are substantially identical. Solid line C is the spectrogram of carbon disulfide used as solvent in preparing the spectrograms.

In carrying out the process of my invention, decachlorotetrahydro-4,7-methanoindeneone, preferably in substantially anhydrous form or in as low a state of hydration as practicable, is reacted with phosphorus pentachloride to effect the replacement of the ketone group with chlorine, for example by mixing the reactants and heating the mixture. The resulting oily reaction product is then cooled and drowned in water, whereupon solid hexachlorocyclopentadiene dimer crystallizes and may be recovered as by filtration and, if desired, washed with a liquid such as methanol which is a solvent for decachlorotetrahydro-4,7-methanoindeneone, but a non-solvent for the reaction product, to dissolve any unreacted decachlorotetrahydro-4,7-methanoindeneone which may be present. The crude dimer product may then be crystallized from a suitable solvent if desired, such as benzene, isopropanol or the like, and if desired may be further purified of residual decachlorotetrahydro-4,7-methanoindeneone, by first dissolving it in a hot hydrocarbon solvent such as benzene and then precipitating it out of solution by the addition of a hydrocarbon-miscible nonsolvent for the dodecachlorotetrahydro-4,7-methanoindene, such as methanol, in which the decachlorotetrahydro-4,7-methanoindeneone is soluble. The product may be further purified if desired, by recrystallization from an aliphatic alcohol such as isopropanol. The resulting dodecachlorotetrahydro-4,7-methanoindene is a white, crystalline solid which sublimes without melting at temperatures above about 240° C., is appreciably soluble in benzene, acetone, kerosene, carbon tetrachloride, etc. and while virtually insoluble in methanol, is appreciably soluble in the lower aliphatic alcohols having two or more carbon atoms, such as ethanol, isopropanol, etc., particularly at elevated temperatures.

The quantity of $PCl_5$ to be used in the preparation of the dimer is not critical, but for best yields should be at least the molecular equivalent of the decachlorotetrahydro-4,7-methanoindeneone, so as to furnish two chlorine atoms to replace the keto oxygen as indicated in the reaction above illustrated, and to react with any water of hydration present. Thus, although it is desirable to use decachlorotetrahydro-4,7-methanoindeneone starting material in as low a state of hydration as possible, nevertheless, hydrated forms may be used if a sufficient quantity of $PCl_5$ is employed to react with all the water of hydration as well as with the keto oxygen, forming $POCl_3$ and $HCl$, and when the expression "equimolecular quantities" is used in the claims to describe the proportions of reactants, it is to be understood to mean a quantity of $PCl_5$ sufficient to react with the keto oxygen and also with the water of hydration present. However, as the use of excesses of $PCl_5$ are not only wasteful, but entail handling of the troublesome $HCl$ formed as a byproduct of the reaction of $PCl_5$ with the water of hydration, it is preferable to dehydrate the decachlorotetrahydro-4,7-methanoindeneone as much as practicable before carrying out the reaction. In general, therefore, quantities of $PCl_5$ only slightly in excess of the molecular equivalent of the decachlorotetrahydro-4,7-methanoindeneone as defined are desirable.

The temperature to which the mixture of decachlorotetrahydro-4,7-methanoindeneone and $PCl_5$ is heated should be at least about 70° C., preferably between about 115° C. and about 160° C. The reaction is usually complete in a period of between about one hour and about six hours. The desired reaction product is separated from the resulting oily reaction mixture, for example by cooling and drowning in an excess of water, for example between about 5 and about 10 volumes of water per volume of the oily reaction mixture, whereupon solid dodecachlorotetrahydro-4,7-methanoindene crystallizes and may be separated by suitable means such as filtration, etc. The resulting crude product is purified by washing with a solvent for decachlorotetrahydro-4,7-methanoindeneone, for example methanol.

The hexachlorocyclopentadiene dimer prepared according to my invention, has the infrared spectrogram shown as dotted line A in the figure. It is identical with the spectrogram of the dimer of hexachlorocyclopentadiene prepared by reacting hexachlorocyclopentadiene with aluminum chloride as described in J. Am. Chem.

Soc. 71, page 954, March 1949, as indicated by the infrared spectrogram of a material made by the AlCl₃ condensation method which is shown as solid line B in the figure.

The infrared spectrograms shown in the figure were prepared on a standard infrared recording spectrophotometer designed for measuring and recording the infrared transmission of solids, liquids and gases, comprising a double infrared beam which scans the spectrum through the wave length range 2.0 to 16 microns, one part of the beam passing through the sample under study, the other passing through a compensating cell. If the sample under study absorbs radiation, the two beams become unequal. The magnitude of this inequality is a measure of the transmission of the sample of the particular wave length, and the record of these differences within the range of wave lengths scanned is the infrared spectrogram, recorded as an ink drawn line on a chart graduated in percent transmission as ordinates and in wave length as abscissae.

Solid samples, such as the compound of my invention, are conveniently measured in solution. The spectrogram shown in the figures was measured by dissolving 0.5 gram of the solid in carbon disulfide and diluting to 10 ml. with the solvent. A small amount of the solution was then introduced into a liquid cell with sodium chloride windows and sealed. The cell was placed in the spectrophotometer in the path of one of the beams as described above.

The infrared spectrogram of any chemical compound serves as an accurate means for identifying the compound. It has been compared with a human fingerprint in its ability to identify a compound with certainty. The characteristic reproducibility of the infrared spectrogram of a given compound is due to the facts that when a molecule is excited by infrared radiation it absorbs energy to a greater degree at some wave length than at others, and that the amount of absorption depends on the configuration and upon the linkages of the atoms composing the molecule. Accordingly, this spectrogram identifies and characterizes the hexachlorocyclopentadiene dimer with certainty.

The following specific example further illustrates my invention.

*Example*

Five parts of hydrated decachlorotetrahydro-4,7-methanoindeneone, purified by solution in methanol, precipitation with water and drying, were mixed with 21 parts of phosphorus pentachloride and the mixture heated for three hours at 125°–150° C. The resulting reaction mixture was cooled to 20° C. and drowned in water. The solid material which formed was filtered and water washed, then washed with methanol to dissolve any unreacted decachlorotetrahydromethanoindeneone which might be present, and dissolved in hot benzene. The benzene solution was mixed with a large excess of methanol to reprecipitate the product, which was filtered, dried and then recrystallized from isopropanol.

Two parts of hexachlorocyclopentadiene dimer were obtained. An infrared spectrogram prepared from this product was found to correspond to that shown as broken line A in the figure and to be identical with the dimer of hexachlorocyclopentadiene prepared by reacting hexachlorocyclopentadiene with aluminum chloride as described in J. Am. Chem. Soc. 71, page 954, March 1949, in physical properties as well as its infrared spectrogram, shown as solid line B in the figure.

While the above describes the preferred embodiments of my invention, it will be understood that departures may be made therefrom within the scope of the specification and claims.

I claim:

1. A process for preparing dodecachlorotetrahydro-4,7-methanoindene which comprises heating decachlorotetrahydro-4,7-methanoindeneone with phosphorus pentachloride at temperatures between about 70° C. and about 160° C. for a period between about one hour and about six hours.

2. A process for preparing dodecachlorotetrahydro-4,7-methanoindene which comprises mixing decachlorotetrahydro-4,7-methanoindeneone with a quantity of PCl₅ at least the molecular equivalent of the decachlorotetrahydro-4,7-methanoindeneone and heating the resultant mixture to a temperature between about 70° C. and about 160° C. for a period of between about one hour and about six hours, cooling the resultant reaction mixture, drowning the mixture in water and recovering solid dodecachlorotetrahydro-4,7-methanoindene.

3. A process for preparing dodecachlorotetrahydro-4,7-methanoindene which comprises mixing substantially anhydrous decachlorotetrahydro-4,7-methanoindeneone with PCl₅ and heating the resulting mixture to a temperature between about 70° C. and about 160° C. for a period of between about one hour and about six hours, cooling the resultant reaction mixture, drowning the mixture in water, recovering solid dodecachlorotetrahydro-4,7-methanoindene and purifying the crude product by washing it with methanol, dissolving it in benzene and drowning the benzene solution in methanol to precipitate the purified product and recovering the crystalline dodecachlorotetrahydro-4,7-methanoindene.

References Cited in the file of this patent

Hunter et al.: "Jour. Am. Chem. Soc.," vol. 55, pages 2567–70 (1933).

Degering et al.: "An Outline of Organic Chemistry," third edition, pages 56–7, 200 (1939).

"Chemical Abstracts," vol. 35, column 2469 (1941). Abstract of article by Churbakov.